UNITED STATES PATENT OFFICE.

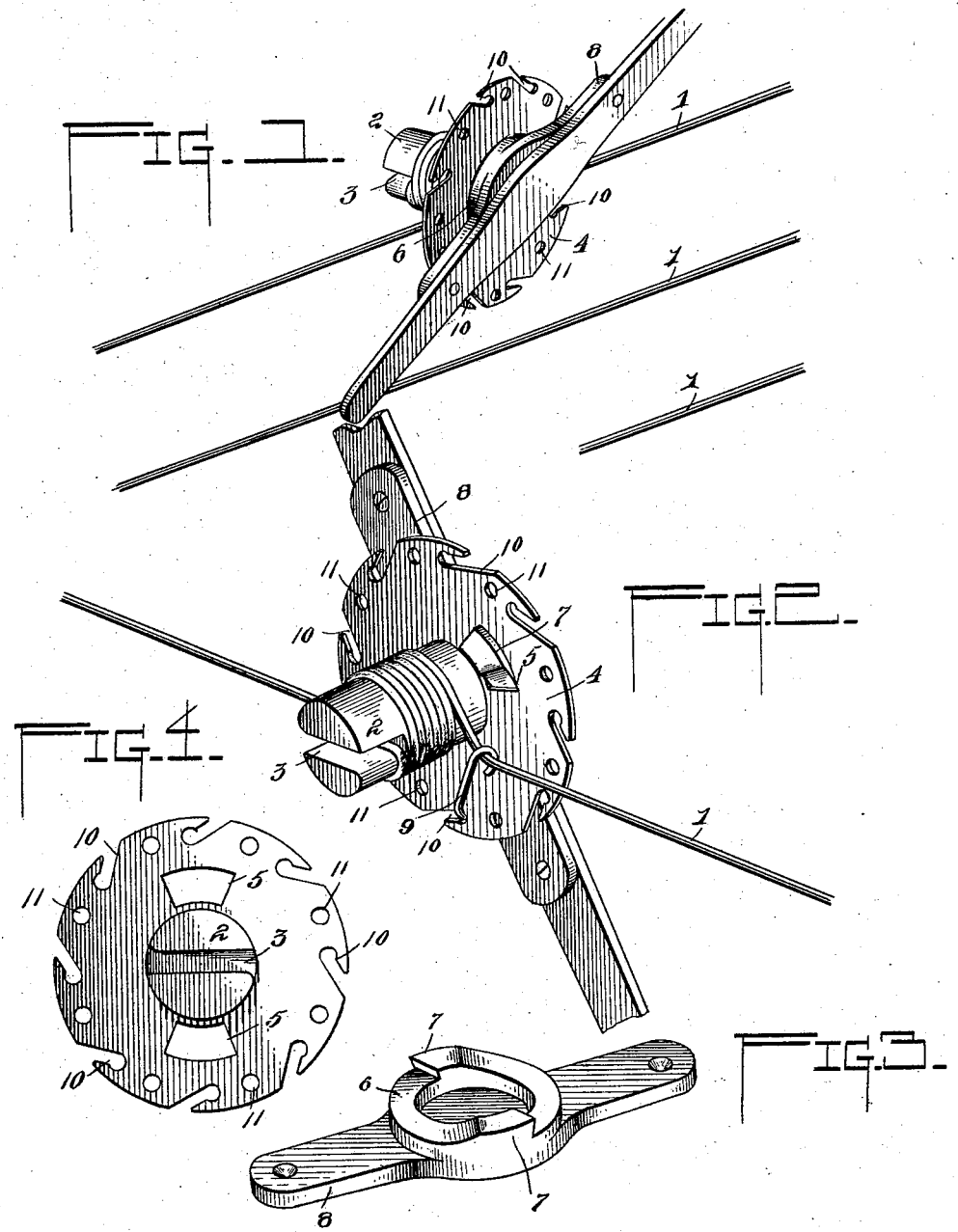

ISRAEL B. BEEKLY, OF GREENVILLE, OHIO, ASSIGNOR OF ONE-HALF TO JOHN F. FLORY, OF SAME PLACE.

WIRE-TIGHTENER.

SPECIFICATION forming part of Letters Patent No. 588,213, dated August 17, 1897.

Application filed September 26, 1896. Serial No. 607,049. (No model.)

*To all whom it may concern:*

Be it known that I, ISRAEL B. BEEKLY, a citizen of the United States, residing at Greenville, in the county of Darke and State of Ohio, have invented a new and useful Wire-Tightener, of which the following is a specification.

My invention relates to wire-tighteners especially adapted for taking up slack in fence-runners; and the object in view is to provide a simple and efficient mid-wire tightener so constructed as to avoid the necessity of a frame for supporting the spool upon which the wire to be tightened is reeled, and to provide improved means for securing the spool against backward rotation during the permanent fastening of the wire.

Further objects and advantages of this invention will appear in the following description, and the novel features thereof will be particularly pointed out in the appended claim.

In the drawings, Figure 1 is a perspective view of a wire-tightener constructed in accordance with my invention applied in the operative position to a fence-runner. Fig. 2 is a detail view of the tightener, showing the opposite side thereof. Fig. 3 is a detail view of the clutch which is carried by the hand-lever for engaging the disk of the spool. Fig. 4 is a face view of the disk.

Similar numerals of reference indicate corresponding parts in all the figures of the drawings.

1 designates fence-runners, to one of which is applied a tightener constructed in accordance with my invention, the same having a spool 2, which is bifurcated or slotted, as shown at 3, at one end to engage the runner, and around which the runner is coiled as the spool is rotated. The opposite end of the spool is provided with a disk 4, which may be cast integral therewith, and is provided at diametrically opposite points with segmental slots 5 for engagement by a clutch 6. Said clutch, which is shown in detail in Fig. 3, is provided with lugs or ears 7, of which the shoulders are undercut, whereby when the lugs or ears are inserted in the segmental slots of the disk said shoulders engage the slots at one end to provide for communicating rotary motion from the hand-lever to the spool. The lugs or ears are beveled at the ends opposite to said shoulders to allow backward rotation of the handle independently of the disk. The clutch is preferably provided with a base-plate 8 for attachment to the handle or lever.

The means which I have illustrated in the drawings for securing the spool at any given adjustment when the runner is at the desired tension consist of terminally-hooked links 9, adapted to be engaged at one end with the runner or wire and at the other end with one of a series of notches 10 in the periphery of the disk, said disk being also provided in the intervals between said notches with perforations 11, with which the hook at one end of the link may be engaged, if preferred. These hooked links are designed to be constructed independently of the other portion of the apparatus, and their specific construction provides for engagement with the runner and disk with facility when the runner has reached the desired tension.

From the above description it will be seen that no frame is required to support the spool, forming the essential feature of my wire-tightening device, and while the device may be applied to a wire contiguous to a post to stretch in one direction only it will be understood that by applying it to a wire at an intermediate point the same may be stretched in both directions, thus adapting it for use under different conditions.

It is desirable in devices of this class to provide a spool and securing means of as simple and cheap construction as possible, for the reason that these members of the tightener are left upon the fence after taking up slack in the runners, and hence I have adopted a spool which is simply slotted or provided with a kerf extending inward from one extremity and a flat continuous disk, of circular construction, provided with diametrically opposite slots 5 and peripheral openings 10 and 11, which may be struck from a blank and is completed by the stamping operation. There is no forming necessary either previous or subsequent to attachment to the spool. A disk of this construction is sufficiently strong to bear any strain to which it may be subjected in ordinary use, and as the disk is flat the operating-lever may be engaged therewith and operate parallel with the plane of the runners without any inconvenience to the operator.

A further advantage of the improved spool and disk resides in the fact that the series of openings in its periphery is continuous, whereby the hooked link may be attached thereto at any point and may be arranged at either one side or the other of the spool, as may be preferable under the conditions of its use.

Various changes in the form, proportion, and the minor details of construction may be resorted to without departing from the spirit or sacrificing any of the advantages of this invention.

Having described my invention, what I claim is—

The herein-described wire-tightener, comprising a spool 2 provided with a longitudinal slot or kerf 3 for engaging a fence-runner, a flat circular disk 4 secured to the opposite end of the spool and having a continuous series of peripheral openings, said disk being provided also with diametrically opposite segmental slots 5 concentric with the disk, a straight operating lever or handle provided at an intermediate point with a clutch arranged in contact with the outer surface of the disk and provided with opposite lugs or ears 7 engaging said segmental slots, and a terminally-hooked link, engaging either of the peripheral openings and the contiguous portion of the wire at either side of the spool, to lock the spool against backward rotation, substantially as specified.

In testimony that I claim the foregoing as my own I have hereto affixed my signature in the presence of two witnesses.

ISRAEL B. BEEKLY.

Witnesses:
H. M. COLE,
WM. SCHNAUS.